United States Patent
Dodt et al.

(10) Patent No.: US 6,244,314 B1
(45) Date of Patent: Jun. 12, 2001

(54) MOTOR VEHICLE WHEEL WITH A TIRE PLACED ON A RIM AND SOUND-ABSORBENT INSERT AS WELL AS METHOD OF PRODUCING A SOUND-ABSORBENT INSERT

(75) Inventors: Thomas Dodt, Stadthagen; Klaus Kleinhoff, Rodenberg; Oliver Schürmann, Langenhagen; Frank Gauterin, Neustadt am Rübenberge; Ivar Veit, Nauheim, all of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 08/955,920

(22) Filed: Oct. 22, 1997

(51) Int. Cl.$^7$ ........................................................ B60C 5/00
(52) U.S. Cl. ........................... 152/158; 152/450; 152/312
(58) Field of Search .................... 152/450, 158, 152/209.7, 310, 311, 312, 313, 520

(56) References Cited

U.S. PATENT DOCUMENTS

| | | | |
|---|---|---|---|
| 4,392,522 | * 7/1983 | Bschorr | 152/310 |
| 4,399,851 | * 8/1983 | Bschorr | 152/156 |
| 4,626,183 | * 12/1986 | Shirai et al. | |
| 5,073,444 | * 12/1991 | Shanelee | 152/310 |
| 5,468,316 | * 11/1995 | O'Coin | 152/310 |
| 5,474,722 | * 12/1995 | Woodhams | |

FOREIGN PATENT DOCUMENTS

| | | |
|---|---|---|
| 2946273 | 5/1981 | (DE) . |
| 3042350 | 2/1987 | (DE) . |
| 4400912 | 7/1995 | (DE) . |
| 038920 | 11/1981 | (EP) . |
| 663306 | * 7/1995 | (EP) . |
| 0826522A1 | * 3/1998 | (EP) ................. 152/209.7 |
| 1211860 | * 11/1970 | (GB) . |
| 63-258201 | 10/1988 | (JP) . |
| 63-258202 | 10/1988 | (JP) . |
| 1-115701 | 5/1989 | (JP) . |
| 1-186402 | 7/1989 | (JP) . |
| 1-240302 | 9/1989 | (JP) . |
| 6-106903 | * 4/1994 | (JP) . |
| 97/21950 | * 6/1997 | (WO) . |

OTHER PUBLICATIONS

An abstract of EP Patent No. 0029 120 published May 27, 1981 with an English Translation.
An abstract of EP Patent No. 0 810 082 published Dec. 3, 1997 with an English Translation.
Patent Abstracts of Japan, M–916, vol. 14, No.6, Jan. 9, 1990 of JP Application No. 63–78258 published Oct. 11, 1989.
English language abstract of Japanese Application No. 6–106903.*

* cited by examiner

*Primary Examiner*—Michael W Ball
*Assistant Examiner*—Barbara J. Musser
(74) *Attorney, Agent, or Firm*—Greenblum & Bernstein P.L.C.

(57) ABSTRACT

Motor vehicle wheel including a wheel rim and a tire having a tire interior enclosed by the wheel rim and the tire. The tire is mounted on the wheel rim, and the wheel also includes an insert composed of a ring-shaped sound-absorbing material that is positioned within the tire interior. The wheel further includes an acoustically transparent support element having tensile strength, at least in a circumferential direction of the tire, that is coupled to the insert.

9 Claims, 5 Drawing Sheets

MOTOR VEHICLE WHEEL WITH A TIRE PLACED ON A RIM AND SOUND-ABSORBENT INSERT AS WELL AS METHOD OF PRODUCING A SOUND-ABSORBENT INSERT

BACKGROUND OF THE INVENTION

1. Field of the Invention

The present invention relates to motor vehicle wheel with a tire mounted on a wheel rim, whereby an insert exhibiting a ring-shaped, rotating, sound-absorbing material is placed inside the tire interior enclosed by the rim and the tire. The invention furthermore relates to a process for manufacturing a sound-absorbing insert.

2. Discussion of Background Information

It is known that the tire vibrations created while rolling a tire is one of the main causes of unpleasant radiating sound. The vibration load created inside the tire body is very large and therefore creates high sound levels. The sound waves originating in the tire body are partially deflected to the exterior via the tire side walls, and partially transferred via motor vehicle components into the vehicle interior. It is now known that the insert of sound-absorbing material in tires or within the interior space created between the tire and wheel rim reduces the radiating sound load.

A solution known from prior art that also relates to a vehicle wheel of the type mentioned at the outset, deals with achieving an effective reduction of the sound waves emanating from the tire body while suggesting a simple way for assembly and disassembly. To this end it is suggested to insert the sound-absorbing material in a flexible tube that can be mounted together with the tire due to its flexibility. The embodiment as a tube has the advantage of an easy assembly method. However, especially at higher speed, when the occurring centrifugal forces become relatively large, a lower weight would be desirably.

A vehicle air tire which is completely or partially covered on its interior surface with a sound reducing coating of open-cell foamed material is furthermore known from the German patent document DE 30 42 350 C2. In order to achieve an effective dampening of the body sound in the frequency ranges that are particularly physiologically significant, it is suggested to use a special, sound-reducing, cross-linked polyurethane foamed material applied at a certain coating thickness.

EP-0 038 920 A1 discloses the addition of vibration absorbers, preferably mounted securely to the tire interior with regard to tension and torque. These vibration absorbers can consist of rubber, synthetic material or similar and additionally contain dampening inserts. DE 29 46 273 A1 also suggests to place sound-absorbing material in the interior of a tire, whereby this document discloses an arrangement of the sound-absorbing material, consisting of open-cell foamed material, on the interior side opposite the tire profile. Among other things it is suggested to fill the whole tire interior with open-cell and roughly structured foamed material. For reasons concerning the firmness, a carrier skeleton can thereby also be embedded in the foamed material.

Open-cell foam material is generally particularly well suited to particularly effectively lower the very high air sound levels created during driving. As a result, the tire-/road sounds radiating to the exterior as well as the noise present in the vehicle interior are reduced. The expert knows that there exists a series of such foamed materials that are very good at meeting these requirements.

In addition there are different materials that act equivalently in absorbing sound in the tire interior, such as absorbent cotton, wool, or felt, finding use as fleece or other form.

In practice, however, changes in the sound-absorbing characteristics of the sound-absorbing materials suited for tire insertion occur, particularly at higher speeds, due to the influence of the increasing centrifugal force, increasing with increased travel velocity, whereby the extent of the changes are also dependent on the material. The sound-absorbing characteristics thereby change due to the deformations occurring in the material and as a result of cross sectional changes of the insert of this material.

SUMMARY OF THE INVENTION

The invention has therefor made it its task to find practical embodiments for such sound-absorbing materials to be placed in the tire interior or the space enclosed by the wheel rim and tire that ensure a good resilience to centrifugal forces with the lowest weight possible and extensively avoid increasing the mass of the insert.

The stated task is solved by outfitting the sound-absorbing insert, at least in one direction, in particular in the circumferential direction of the tire, with acoustically transparent support elements exhibiting tensile strength.

As alternative or addition to the solution of the stated task, the sound-absorbing material of the insert can also be an open-cell foamed material that exhibits pore orientations extending predominately in one direction—that of the circumferential direction of the tire.

Both solutions result in the insert being given tensile strength that, compared to known solutions, significantly increases the ability to withstand the centrifugal force without also being associated with an undesirable increase of mass of the sound-absorbing insert that is subjected to the centrifugal force.

In the solution with a support elements exhibiting tensile strength, the support elements are able to avoid the undesirable and unfavorable deformations of the sound-absorbing material or are able to reduce them to a great extent. In the second solution in accordance with the invention, the material by itself is, to a greater degree, in a position to act as "support element".

A particularly preferred arrangement of the support elements, the support elements wraps over the surface of the sound-absorbing insert that is open to the tire interior and covers at least a portion of its cross section. It hereby deals with a simple but effective way to ensure a good resilience of the sound-absorbing insert to centrifugal forces.

In an alternative embodiment the support element, viewed in the radial direction, is placed at discrete distances from each other in the sound-absorbing insert. In this embodiment additional measures are taken to counteract the deformations occurring in the interior of the sound-absorbing insert. This embodiment variation is particularly advantageous at higher velocities and therefore preferably used in tires that are to be utilized at a high velocity range. In another embodiment variation of the invention, also exhibiting these advantages, the support element is constructed of fibers that are distributed in the sound-absorbing insert and oriented predominately in the circumferential direction of the tire.

A series of possibilities exist for concrete embodiments of the support elements. A preferred embodiment provides that the support element is designed as a woven mesh that is constructed in a mesh-like fashion. In the embodiment involving a woven mesh it is particularly easy to achieve the tensile strength in the circumferential direction of the tire by constructing the fibers running in this direction appropriately strong.

In an alternative embodiment of the support elements, the support element is intended to be constructed of a perforated foil that is in particular constructed isotropic. A foil offers, among other things, the advantage that it able to be easily handled and is able to be constructed so that it is flexible in all directions.

The sound-absorbing insert itself is constructed as sealed ring in order to ensure good sound-absorbing characteristics and to avoid possible undesirable effects on the remaining vehicle tire.

The closed ring can thereby be constructed of a ring-shaped strip of sound-absorbing material that is looped around several times. The arrangement of the support elements is easily possible in an embodiment involving strips and also particularly advantageous, whereby it is sufficient to equip the strip with support elements only on one side should it be constructed as foil or woven mesh.

In order to attach the support element with the ring or strip one can resort to simple methods such as gluing, welding or similar.

The assembly of the sound-absorbing insert into the tire interior or on the wheel rim should be able to be executed easily. For this purpose the sound-absorbing insert or ring can for example consist of several circumferential elements that are joined after assembly. In order to ensure a good and firm seat of the sound-absorbing insert on the wheel rim, one can resort to a support element material which puts the sound-reducing insert under tension at least in the circumferential direction. A sound-reducing material that undergoes shrinkage with thermal treatment can be used in addition or as alternative.

The present invention also relates to a process for manufacturing a sound-absorbing insert of open-cell foamed material to be placed inside a vehicle tire. In the process according to the invention, the raw material for the foamed material is fed through an extrusion jet. This opens the door for a number of possibilities of influencing the raw material of the foamed material and its processing up to the creation of the finished foamed material, so that the foamed material is manufactured in a manner that maximizes its resilience to centrifugal forces.

The first variation of the process provides that the foaming process begins or takes place during the passage through the extrusion jet. The pores being created in the foaming process are thus forced, at least essentially, in a single direction. The foamed material for a sound-absorbing insert then exhibits a degree of firmness and stiffness in this direction, the circumferential direction of the tire during the insertion of the foamed material, so that the sound-absorbing insert exhibits an improved centrifugal force take-up.

In another variation of the process in accordance with the invention the add-mixing of fiber pulp to the raw material for the foamed material, before the foaming and before passage through the extrusion jet, causes a preferred orientation of the fibers in a single direction during passage through the extrusion jet. The foamed material being created therefore at least essentially contains uniformly distributed fibers that run in a preferred direction so that the sound-absorbing insert in the tire, with the appropriate use of the foamed material, has a significantly increased ability to resist the centrifugal force.

If, as is intended in another variation of the process, one pays attention to the fact that the foaming only occurs after the passage through the extrusion jet, a foamed material is created with fibers that are oriented in a preferred direction and distributed uniformly. However, the pores that were created were not influenced. In the described manner this material is also very suitable for the use in a sound-absorbing insert.

The present invention is directed to a motor vehicle wheel that includes a wheel rim and a tire having a tire interior enclosed by the wheel rim and the tire. The tire is mounted on the wheel rim, and an insert composed of a ring-shaped sound-absorbing material is positioned within the tire interior. The wheel further includes an acoustically transparent support element having tensile strength, at least in a circumferential direction of the tire that is coupled to the insert.

The present invention is also directed to a motor vehicle wheel that includes a wheel rim and a tire having a tire interior enclosed by the wheel rim and the tire. The tire is mounted on the wheel rim, and includes an insert composed of a ring-shaped sound-absorbing material that is positioned within the tire interior. The sound-absorbing material may include an open-cell foam material having pores that extend for the most part in a single direction that corresponds with a circumference of the tire.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PRESENT INVENTION

Figure 1:
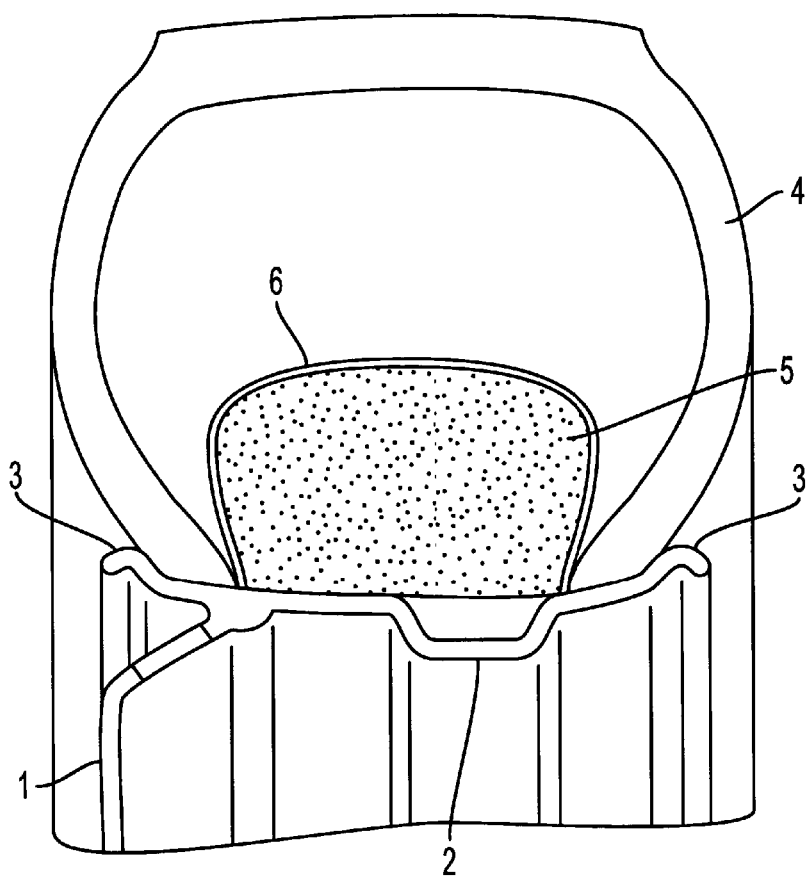
FIG. 1 illustrates a cross-section through a tire mounted on a wheel rim.

FIG. 1 shows a conventional wheel rim 1 for a tire 4 that is equipped with a drop base 2, rim beads 3, and bead seat surface 3a. It also should be mentioned that the scope of the present invention is neither limited to a particular type of air tire nor a particular type of wheel rim.

As FIG. 1 illustrates in the first embodiment of the invention, a ring 5 of sound-absorbing material, situated inside the sealed interior space between the tire 4 and the wheel rim 1, is wrapped around and seated on the wheel rim 1. Open-pore foamed materials particularly well suited for air sound absorption, for example PU-foams with a weight around 50 kg/m$^3$ and a mean pore content of approximately 2 mm³, as well as other effective sound-absorbing materials such as felt, absorbing cotton, and materials of similar structure can be considered as starting material for the ring 5. In describing the invention, the following only makes reference to foamed material rings but it is, as mentioned earlier, also possible to use other materials.

The foamed material ring 5 is constructed such that it covers the drop bed 2 but does not fill it entirely and extends between the two tire beads of the tire 4. The foamed material ring 5 is otherwise constructed in its cross section such that it possesses a round to rectangular cross section. In the illustrated embodiment, the cross section of the ring 5 resembles a rectangle with rounded edges.

Of particular significance for such air sound-absorbing inserts is an embodiment that weighs as little as possible. It is to be ensured that the sound-absorbing material preferably does not deform or only slightly when the tire is rolling, in particular with centrifugal forces noticeable at higher velocities. This resilience to centrifugal forces shall ensure that the desired, original, and designed sound-absorbing properties do not change during operation, i.e. during the rolling of the tire or vehicle wheel.

Figure 2:
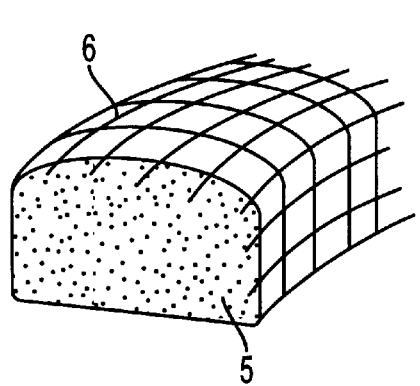
FIG. 2 illustrates a cross-sectional and perspective view of a portion of the sound-absorbing insert.

In the first embodiment of the present invention, illustrated in FIG. 1 and FIG. 2, the foamed material ring 5 is surrounded on its exterior by an acoustically transparent, woven mesh that is constructed in a mesh-like manner and acts as a support element. The wrapping by the woven mesh 6 can be a complete one or only be performed where the foamed material ring 5 does not make contact on the wheel rim 1. This embodiment is particularly advantageous when the foamed material ring 5 is glued to the wheel rim 1. The acoustically transparent woven mesh 6 contains fibers that have tensile strength in the circumferential direction and provide the foamed material ring 5 the required strength with respect to the centrifugal forces. These fibers with a particularly high degree of tensile strength can, for example, consist of nylon or of aromatic polyamide. In the axial direction, the fibers can be designed of a material exhibiting a lower thickness which is advantageous for the weight of the ring 5.

The acoustical transparency of the support elements constructed as of woven mesh 6 is provided if it, projected into a plane parallel to the progression of the support elements, exhibits more empty surfaces than fibers.

The woven mesh 6 can be attached to the foamed material ring 5 by wrapping and subsequently closing the seam by welding, gluing, or a special locking mechanism and can be sealed to the exterior in a tear-proof manner. In the area of a possible seam location one should also, depending on the location of the seam, pay attention to the appropriate sound transparency.

If the foamed material ring is to be pulled over the wheel rim as closed ring, the foamed material ring 5 is preferably wrapped entirely or partially with the woven mesh 6 after assembly. The foamed material ring 5 can thereby be attached to the woven mesh 6 by welding, thermal gluing, or similar measures.

If the foamed material ring 5 is already supplied with the support element 6 on one side and/or on the lateral surfaces before the assembly, the assembly of the arrangement can simply occur by rolling up the ring before insertion and pulling it over the wheel rim 1 in that position.

Figure 1A:
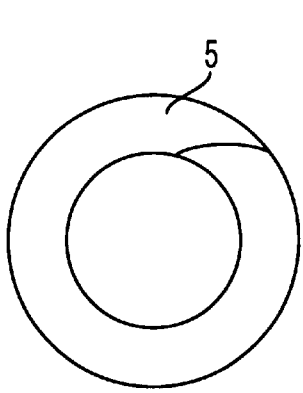
FIGS. 1a and 1b illustrate side views of alternative embodiments of a sound-absorbing insert depicted in FIG. 1.

FIG. 1a shows one possibility of the embodiment of the foamed material ring 5 that is pre-shaped in a ring-shaped manner and cut open on one location for assembly. In this case the support element can also be mounted before assembly. The slit can be closed again by gluing.

Figure 1B:
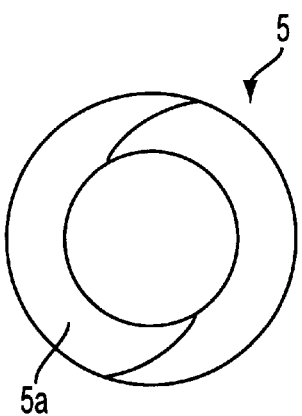

FIG. 1b shows an embodiment of a ring 5 consisting of two segments 15. The ring can hereby already be manufactured as two pieces. Alternatively a ring manufactured as a single piece can subsequently be split into segments by cutting. The parts in this variation can also be glued or attached in a similar manner.

A perforated foil, in particular consisting of synthetic material, can also be used as an alternative to the woven mesh as the support element, whereby preferably a uniform perforation is designed and one is, as in the embodiment of the woven mesh as support element, to pay attention to the acoustical transparency by letting the surface area of the holes dominate. The foil can be mounted in an adhesive fashion on the foamed material, analogous to the embodiment involving woven mesh.

For an optimal functioning of the present invention it is important that the foamed material ring 5 is positioned as closely to the wheel rim 1 as possible. It can therefore also be advantageous to glue the ring 5 onto the wheel rim 1.

In the alternative embodiments illustrated in FIGS. 1a and 1b, foamed material ring 5 can be manufactured with an inner contour that corresponds to the contour of the wheel rim 1 with drop base. Further, facilitated by the assembly here is providing the foamed material ring in segmented form.

Figure 3:
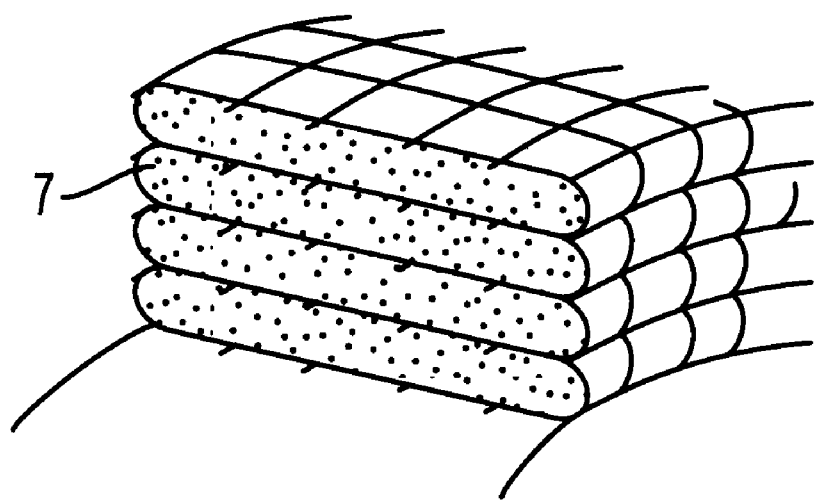
FIG. 3 illustrates an alternative embodiment of the sound-absorbing insert depicted in FIG. 2.
Figure 3A:
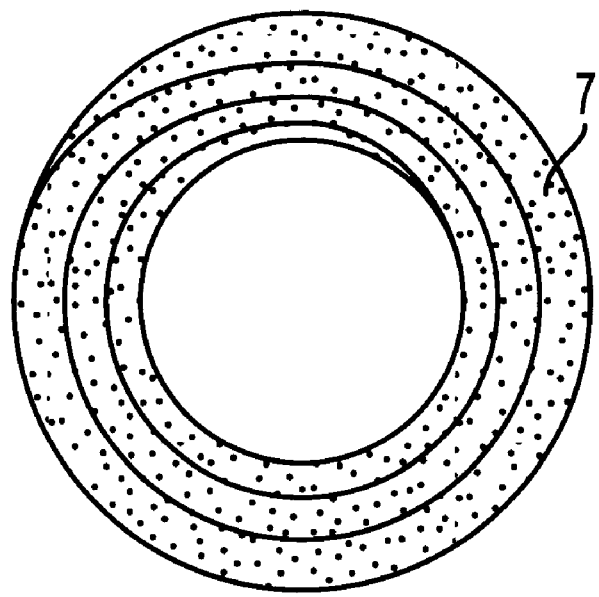
FIG. 3a illustrates a side view of the insert depicted in FIG. 3.

In another embodiment of the invention, illustrated in FIG. 3, a foamed material strip 7 of appropriate width, instead of the closed foamed material ring, is wrapped around the wheel rim 1 in at least two layers. The foamed material strip 7, wrapped in several layers, can conform to the contour of the wheel rim 1 in an easier way. A single strip (as shown in FIG. 3a) than one strip can also be used, for example to facilitate the conformation to the contour of the wheel rim.

In order to improve the resilience with respect to the centrifugal force, the foamed material strip also contains support elements that are constructed as woven mesh or foil. As already described, one can also mount the support elements in this embodiment onto the completely wrapped ring, or, in a particularly advantageous way, the support elements can be applied, preferably in an adhesive manner, to the foamed material strip 7 before it is wrapped around the wheel rim.

Each layer of the wrapped foamed material strip 7 therefore also contains a layer of support elements.

In this embodiment it is sufficient if only one side (which should be the outer side in the radial direction in the wrapped state) is coated with the support element.

It is particularly advantageous when the support elements exert a certain tension on the sound-absorbing material. This is achieved in the embodiment involving a woven mesh by using a support element material that is able to flex to a certain degree. In another preferred embodiment this material strongly stiffens after surpassing a certain degree of flexing. It is thereby particularly advantageous to utilize materials that begin to stiffen in the range of 10 to 60% flexing.

For the creation of a pre-tension, materials that shrink under thermal straining can be used for the support elements. Materials that shrink with thermal treatment can also be used for the foamed material of the ring. The foamed material ring is put under tension by each of these measures and a firm seat on the wheel rim 1 is thereby ensured.

Figure 4:
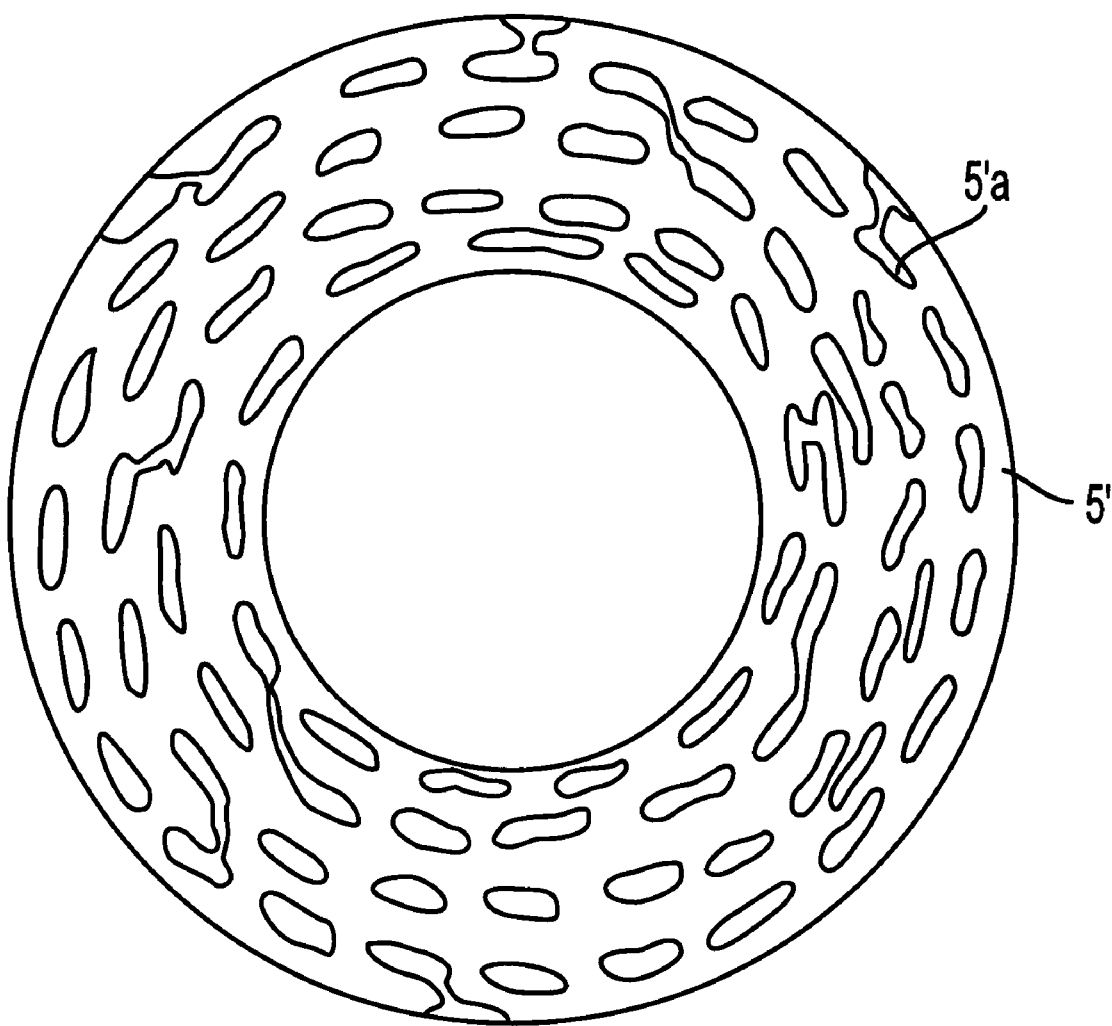
FIG. 4 illustrates a side view of a further embodiment of the sound-absorbing insert.
Figure 7:
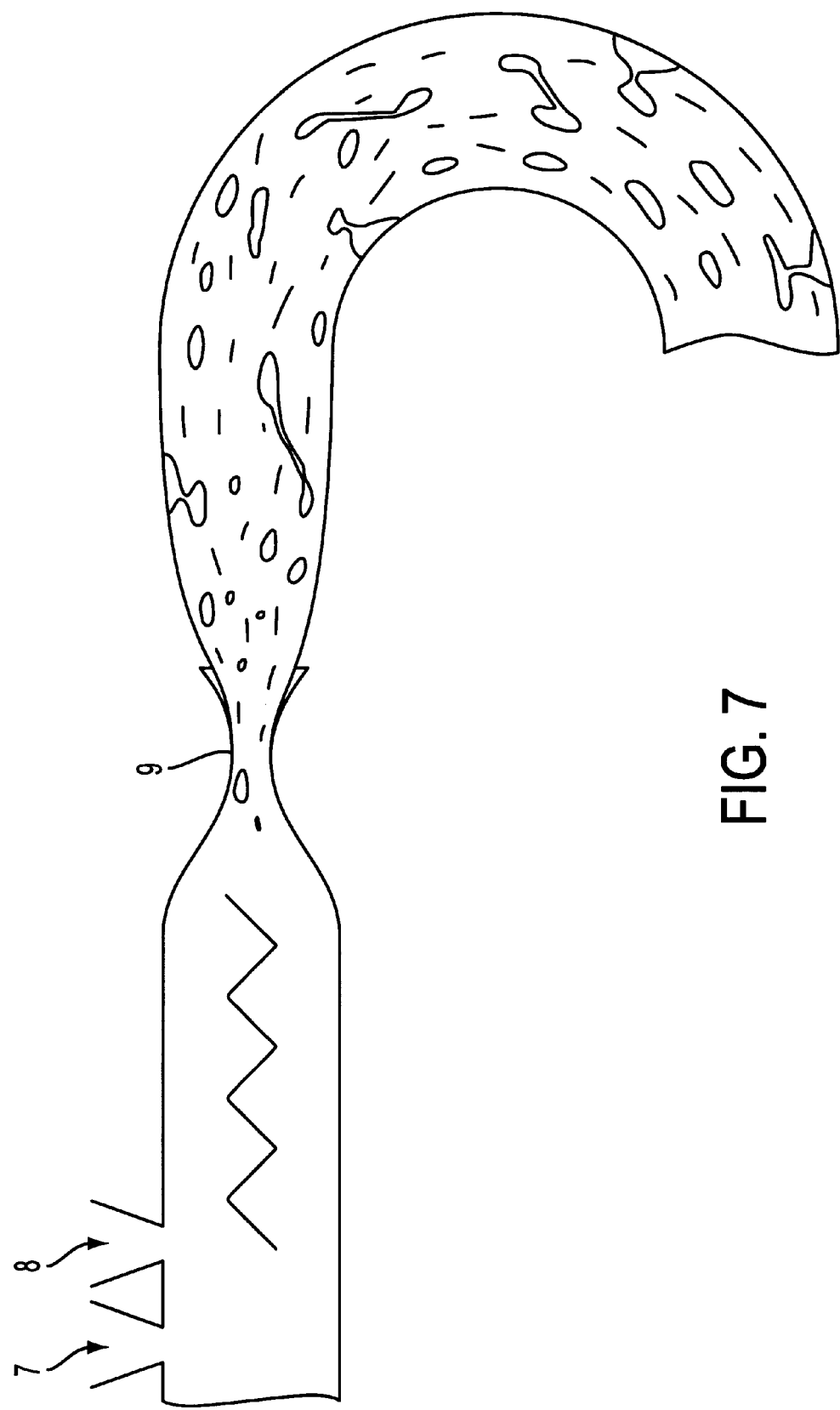
FIG. 7 schematically illustrates the manufacturing the inserts.

In another possible embodiment of the invention, illustrated in FIG. 4, the foamed material of the foamed material ring 5' acts as a support element by itself. For this the foamed material is processed such that longitudinal-shaped pores 5'a created in the foaming process and, at least for the main part, point in one direction, the circumferential direction of the wheel rim or tire in the finished end product. For this, as illustrated schematically in FIG. 7, the raw material for the foam, for example the polymer 7 and the foaming agent 8, are admixed and fed through an extrusion jet 9 during the foaming process, causing the before-mentioned longitudinal formation of the pores 5'a, whereby, as mentioned earlier, the extrusion direction and thereby the direction of the pores 5'a being created in the longitudinal form coincide with the direction of the ring 5' being created. Foamed material created in this manner thereby exhibits a greater degree of firmness and stiffness in the circumferential direction than in the radial direction, whereby the resilience to the centrifugal force is improved.

Figure 5:
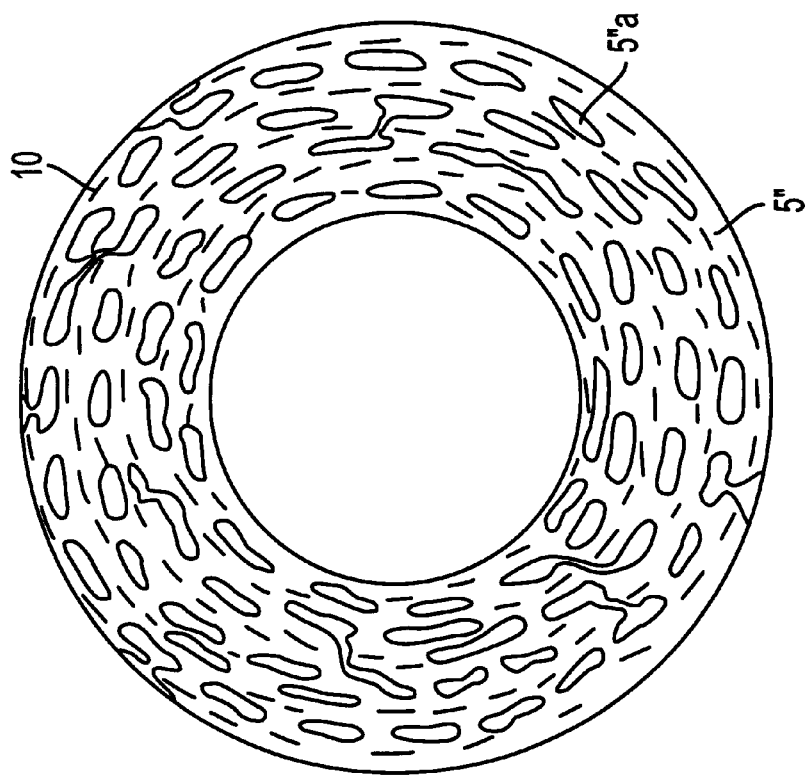
FIG. 5 illustrates a side view of another embodiment of the sound-absorbing insert.

In addition, in particular for vehicle tires that are designed to be suitable for higher speeds and for which the centrifugal force up-take of the sound-absorbing insert should be appropriately larger, fiber pulp can be mixed into the material to be foamed either before or with the addition of the reacting additives. A foamed material ring 5" created thereof is illustrated in FIG. 5. During the extrusion process the fibers 10 are also predominantly oriented in one direction, i.e. in the direction of the longitudinally stretched pores 5"a and therefore increase the stiffness and firmness of the foamed material ring 5" in the direction of the circumference without a large addition of mass. Due to the increased tensile strength created by the fibers 10, the assembly of the ring 5" on a single-piece wheel rim is hampered. However it is possible since fiber additives generally do not lower the tear flexibility. Because of the virtually unchanged softness of the ring 5" in the radial and the axial direction and the at most average softness in the axial direction, an assembly process is furthermore conceivable wherein the ring 5" is pulled over the wheel bead by taking advantage of the drop base in wobble position.

Figure 6:
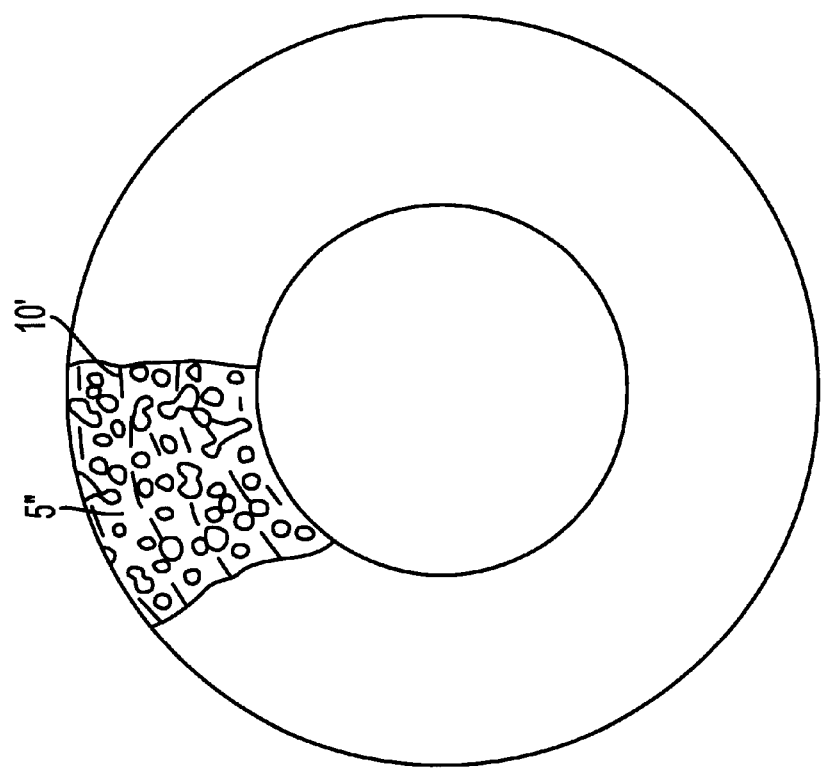
FIG. 6 illustrates a side view of still another embodiment of the sound-absorbing insert.

FIG. 6 shows an embodiment of a foamed material ring 5''' that contains the fibers 10' oriented in the circumferential direction but whose pores 5'''a do not have a preferred orientation. The manufacturing of such a ring 5''', is for example possible by allowing the foaming of the raw material containing the fibers 10' only to occur after passing through the extrusion jet in which an appropriate orientation of the fibers 10' takes place.

With an appropriately equipped duplex extruder is furthermore possible to keep a radially outer layer on the ring free of reinforcing fibers, whereby this layer is to be kept thin, for example 0.5 to 2 mm, if it is to be arranged close to the wheel rim, and can, for example, measure 1 to 6 mm, if it is to be arranged close to the running surface.

It is also noted that different combinations of the individual embodiments are possible. An embodiment with oriented pore and/or fibers can, for example, be combined with an enclosing support element. Even though only sound-absorbing inserts arranged close to the wheel rim are illustrated, the present invention is not limited to such scenarios. Inserts in accordance with the invention can also be advantageously implemented in an arrangement close to the running surface, in particular in an arrangement immediately radially inside the running strip.

What is claimed is:

1. A motor vehicle wheel comprising:

a wheel rim;

a tire having a tire interior enclosed by the wheel rim and the tire;

the tire being mounted on the wheel rim;

an insert composed of a ring-shaped sound-absorbing material;

the insert being positioned within the tire interior; and the sound-absorbing material comprising an open-cell foam material having pores that extend substantially in a single direction that corresponds with a circumference of the tire.

2. A motor vehicle wheel comprising:

a wheel rim;

a tire having a tire interior enclosed by the wheel rim and the tire;

the tire being mounted on the wheel riml;

an insert composed of a ring-shaped sound-absorbing material;

the insert being positioned within the tire interior;

an acoustically transparent support element having tensile strength to resist stretching, at least in a circumferential direction of the tire;

the acoustically transparent support element being coupled to the insert; and the sound-reducing material being shrinkable via thermal treatment.

3. The motor vehicle wheel in accordance with claim 1, the insert having a surface arranged to be open to the tire interior at least over a portion of its cross-section; and an acoustically transparent support element being adapted to wrap the surface of the insert.

4. The motor vehicle wheel in accordance with claim 1, further comprising acoustically transparent support elements composed of fibers arranged within the insert and oriented substantially in the circumferential direction of the tire.

5. The motor vehicle wheel in accordance with claim 1, the insert being formed as a closed ring.

6. The motor vehicle wheel in accordance with claim 5, the closed ring being composed of a strip of sound-reducing material adapted to be wrapped several times in a ring-like manner.

7. The motor vehicle wheel in accordance with claim 6, the strip having at least one side coupled to an acoustically transparent support element.

8. The motor vehicle wheel in accordance with claim 1, the insert comprising a plurality of radially arranged insert layers.

9. The motor vehicle wheel in accordance with claim 1, wherein the insert is mounted at the wheel rim.

* * * * *